Patented Aug. 3, 1954

2,685,229

UNITED STATES PATENT OFFICE 2,685,229

PHOTOGRAPHIC OBJECTIVE OF THREE AIR SPACED SUBASSEMBLY MEMBERS IN AXIAL ALIGNMENT

Hans Schulz, Biel, Switzerland, and Arthur Seibert, Wetzlar, Germany, assignors to Cycloptic Anstalt fur Optik und Mechanik, Vaduz, Liechtenstein Application August 16, 1952, Serial No. 304,830

Claims priority, application Switzerland August 18, 1951

8 Claims. (Cl. 88—57)

The instant invention relates to improvements in objectives particularly, for example, for photography on substandard size film.

An object of the invention is to provide an objective having a relative aperture greater than 1:1.4 in which for field angles of about 36 degrees peripheral vignetting is less than 50%, the objective at the same time being substantially totally corrected within the image area of good definition.

Most prior known photographic objectives are derived from the Petzval or Gauss type of objectives but their lens speeds do not exceed F/1.5 or F/1.4 because with greater speeds either the aberrations of the objective become too great or the radii of curvature of the lenses would, on the attempted correction for the aberrations, become so small that the lenses could no longer be made of the requisite diameters. At the same time such prior known objectives possess appreciable marginal vignetting which, for example, amounts to more than 80% for a field angle of 36 degrees and an aperture ratio of F/1.5 if good image definition is to be obtained.

The objective of the instant invention has an aperture ratio greater than F/1.5 and, at a field angle of 36 degrees, has vignetting of less than 50% and is substantially fully corrected within this field of view. The objective of the instant invention accomplished this by (a) having the rear principal plane of an object-side subassembly coincide, at least substantially, with the front focal plane of an intermediate subassembly so that the principal rays entering the object side of the object-side subassembly emerge from the image side of the intermediate subassembly approximately parallel the optical axis of the objective, and an image-side subassembly deflects the emergent principal rays from such approximate parallelism; (b) making the focal length of the object-side subassembly greater than six times the total focal length of the objective; (c) making the focal length of the intermediate subassembly differ by not more than 40% from the total focal length of the objective; and (d) making the absolute value of the focal length of the image-side subassembly differ by not more than 20% from the focal length of the intermediate subassembly.

Figure 1:
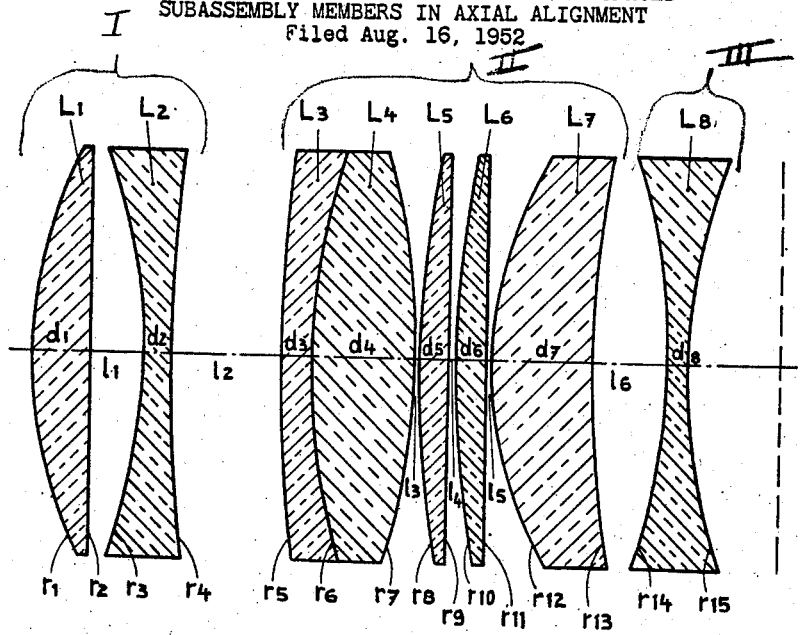
Figure 2:
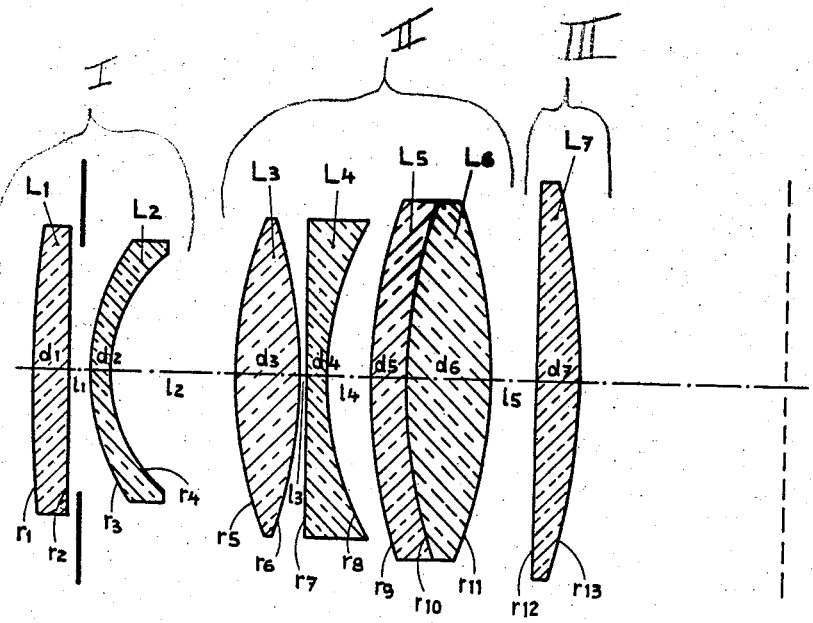

The instant invention and its objects will be more fully understood by the following specific description with reference to the accompanying drawing in which each of Figures 1 and 2 shows an axial section through the lens array of an illustrative embodiment of the objective of the invention. Each illustrative embodiment comprises three subassemblies axially aligned and separated by air spaces from each other.

In the first illustrative embodiment of Figure 1, the object-side subassembly comprises two air spaced lenses $L_1$ and $L_2$. The intermediate subassembly consists of a plurality of air spaced lens elements of which the first element consists of the cemented lenses $L_3$ and $L_4$, the second element is taken as the two air spaced lenses $L_5$ and $L_6$, and the third element is the meniscus lens $L_7$ of which the concave side faces the image side of the objective. The image-side subassembly is the biconcave lens $L_8$.

The constructional data of the first illustrative embodiment, for a focal length of 100.0, an including field of more than 36 degrees, an image distance of 18.9 and a relative aperture of 1.1.25, including the refractive index $n_D$, the Abbe number V and the lens diameter $\phi$ is as follows, where $r$ is the radius of the lens surface, $d$ is the axial thickness of the lens, $l$ is the axial air spacing between the lens surfaces, and a plus sign before a radius indicates curvature convex to the object-side, a minus sign so positioned indicates curvature concave to the object side, and the respective subscripts are in ascending order from object side to image side:

|  |  | $n_D$ | V | $\phi$ |
|---|---|---|---|---|
| $r_1 = + 81.34$ |  |  |  |  |
|  | $d_1 = 14.65$ | 1.6204 | 60.3 | 84 |
| $r_2 = \infty$ |  |  |  |  |
|  | $l_1 = 11.7$ |  |  |  |
| $r_3 = -108.2$ |  |  |  |  |
|  | $d_2 = 7.3$ | 1.6129 | 37.0 | 84 |
| $r_4 = +309.2$ |  |  |  |  |
|  | $l_2 = 21.45$ |  |  |  |
| $r_5 = +284.2$ |  |  |  |  |
|  | $d_3 = 8.75$ | 1.6477 | 33.9 | 96 |
| $r_6 = + 96.6$ |  |  |  |  |
|  | $d_4 = 27.14$ | 1.5163 | 64.0 | 96 |
| $r_7 = -131.6$ |  |  |  |  |
|  | $l_3 = 0.98$ |  |  |  |
| $r_8 = +195.0$ |  |  |  |  |
|  | $d_5 = 8.28$ | 1.5163 | 64.0 | 96 |
| $r_9 = \infty$ |  |  |  |  |
|  | $l_4 = 0.98$ |  |  |  |
| $r_{10} = +195.0$ |  |  |  |  |
|  | $d_6 = 8.28$ | 1.5163 | 64.0 | 96 |
| $r_{11} = \infty$ |  |  |  |  |
|  | $l_5 = 0.98$ |  |  |  |
| $r_{12} = + 78.0$ |  |  |  |  |
|  | $d_7 = 24.20$ | 1.5477 | 64.0 | 90 |
| $r_{13} = +306.0$ |  |  |  |  |
|  | $l_6 = 17.65$ |  |  |  |
| $r_{14} = -130.0$ |  |  |  |  |
|  | $d_8 = 3.86$ | 1.7440 | 44.7 | 70 |
| $r_{15} = +107.2$ |  |  |  |  |

It will be noted that the indices of refraction of the glass of the lenses of the object-side subassembly differ from each other by less than 0.2; the refractive powers of the above identified three elements of the intermediate subassembly have values of 0.474, 0.519 and 0.543 respectively, relative unit refractive power, that is, they differ from each other by not more than 20%; and the refractive index, $n=1.7440$ of the glass of the image-side subassembly, lens $L_8$, is greater than that of the glass of any of the other lenses. The radii of curvature of the biconcave lens $L_8$ differ by 22.8, that is, by less than 20% of the larger radius $r_{14}$.

The position of the rear principal plane of the object-side sub-assembly $L_1L_2$, coincides substantially with that of the front focal plane of the intermediate subassembly $L_3L_4L_5L_6L_7$, whereby principal rays entering the object-side assembly must emerge from lens $L_7$ substantially parallel the optical axis of the objective, the image-side subassembly $L_8$ deflecting the principal rays relative the optical axis. The focal length of the object-side subassembly $L_1L_2$ is $+815$, that is, is in excess of six times the total focal length of the objective; the focal length of the intermediate subassembly is $+68$ and thus differs by less than 40% from the total focal length of the whole objective; and the focal length of the image-side subassembly is $-78.5$, and hence in absolute magnitude differs by less than 20% from magnitude of $+68$ for the focal length of the intermediate subassembly.

The spacing between the two adjacent principal planes of the object-side subassembly, respectively of the intermediate subassembly, is 188.1, and thus differs by less than 6% from twice the focal length of the objective. The spacing between the adjacent principal planes of respectively the intermediate and image-side subassemblies is 45.5, thus being about one third the sum of the focal length of the intermediate subassembly and the absolute magnitude of the focal length of the image-side subassembly.

In the first illustrative embodiment, lenses $L_5$ and $L_6$ are of the same glass, and comprise the second element of the intermediate subassembly. Computation has demonstrated that they may be replaced by a single lens without departing from the instant invention.

The second illustrative embodiment, shown in Figure 2, comprises a total of seven lenses axially aligned and divided into the required three subassemblies, the object-side subassembly comprising lenses $L_1$ and $L_2$, the intermediate subassembly consisting of three air spaced elements of which the first is a positive lens $L_3$, the second is lens $L_4$, and the third comprises the cemented lenses $L_5$ and $L_6$, and the image-side subassembly is lens $L_7$.

The constructional data for the second illustrative embodiment corresponding to that given for the first illustrative embodiment is as follows:

[Focal length=1.000   Relative aperture F/1.24]

|  |  | $n_D$ | V | $\phi$ |
|---|---|---|---|---|
| $r_1 = + 3.3895$ |  |  |  |  |
|  | $d_1 = 0.10$ | 1.6779 | 55.3 | 0.63 |
| $r_2 = \infty$ |  |  |  |  |
|  | $l_1 = 0.05$ |  |  |  |
| $r_3 = + 0.47619$ |  |  |  |  |
|  | $d_2 = 0.06$ | 1.5814 | 40.8 | 0.59 |
| $r_4 = + 0.36193$ |  |  |  |  |
|  | $l_2 = 0.329$ |  |  |  |
| $r_5 = + 0.94993$ |  |  |  |  |
|  | $d_3 = 0.167$ | 1.5163 | 64.0 | 0.70 |
| $r_6 = - 1.12223$ |  |  |  |  |
|  | $l_3 = 0.01$ |  |  |  |
| $r_7 = -11.560$ |  |  |  |  |
|  | $d_4 = 0.0627$ | 1.6236 | 36.7 | 0.70 |
| $r_8 = + 0.73094$ |  |  |  |  |
|  | $l_4 = 0.1$ |  |  |  |
| $r_9 = + 1.30003$ |  |  |  |  |
|  | $d_5 = 0.08$ | 1.6236 | 36.7 | 0.79 |
| $r_{10} = + 1.12223$ |  |  |  |  |
|  | $d_6 = 0.20$ | 1.5163 | 64.0 | 0.79 |
| $r_{11} = - 0.94993$ |  |  |  |  |
|  | $l_5 = 0.10$ |  |  |  |
| $r_{12} = \infty$ |  |  |  |  |
|  | $d_7 = 0.10$ | 1.5400 | 59.6 | 0.88 |
| $r_{13} = - 1.6719$ |  |  |  |  |

It will be noted that similarly in the second illustrative embodiment, principal rays incident at a 15 degree inclination on the object side of the object-side subassembly will emerge from the intermediate subassembly at an inclination of 4 degrees, that is approximately parallel the optical axis of the objective. If such incident inclination is 22.5 degrees, the principal rays emerge at an inclination of 5 degrees to such optical axis. The focal length of the object-side subassembly is $-10.4$, that is in its absolute magnitude is in excess of six times the total focal length of the objective of Figure 2; the focal length of the intermediate subassembly thereof is 1.08 and thus differs by less than 40% from the total focal length of such objective; and the absolute magnitude of the image-side subassembly thereof is 1.0869 and thus differs by less than 20% from the focal length of the intermediate subassembly.

The embodiments of Figures 1 and 2 are illustrative only and various modifications will suggest themselves to those skilled in the art as to one or more of the particular values given without departing from the spirit and scope of the invention.

What is claimed is:
1. Photographic objective having a relative ap- erture greater than F/1.4 and reduced vignetting, comprising an object-side subassembly, an intermediate subassembly aligned with and spaced from the object-side subassembly, the object-side and intermediate subassemblies being so positioned that the rear principal plane of the former coincides substantially with the front focal plane of the latter subassembly, and an image-side subassembly aligned optically with and spaced from the intermediate subassembly, the absolute magnitude of the focal length of the object-side subassembly being between six times the absolute magnitude of the total focal length of the objective and infinity inclusive, the absolute magnitude of the focal length of the intermediate subassembly lying between 60% and 140% inclusive of the absolute magnitude of the total focal length of the objective, and the absolute magnitude of the focal length of the image-side subassembly being between 80% and 120% inclusive of the absolute magnitude of the focal length of the intermediate subassembly.

2. Photographic objective according to claim 1 in which the object-side and the intermediate subassemblies are so positioned relative each other that the spacing between their respective facing principal planes is of a magnitude between 94% and 106% inclusive of twice the total focal length of the objective.

3. Photographic objective according to claim 1 in which the intermediate subassembly consists of a first lens element, a second lens element and a third lens element, the absolute magnitudes of the respective refractive powers of the lens elements differing from each other not in excess of 20%.

4. Photographic objective according to claim 1 in which the intermediate subassembly consists of a first lens element, a second lens element and a third lens element, all the lens elements being air spaced from each other, the first lens element consisting of a cemented lens, the second lens element of two air spaced positive lenses, and the third lens element of a meniscus lens whose concave surface faces the image side of the objective.

5. Photographic objective according to claim 1 in which the intermediate subassembly comprises a first lens element, a second lens element and a third lens element, the lens elements being air spaced from each other, the first lens element consisting of a positive lens, the second lens element being a negative lens, and the third lens element a cemented compound lens.

6. Photographic objective according to claim 1 in which the object-side subassembly consists of one negative and one positive lens, the index of refraction of the positive lens being greater than that of the negative lens.

7. Photographic objective having a relative aperture of F/1.24 and a peripheral vignetting less than 50% with a field of view of over 36 degrees, comprising an object-side subassembly, an aligned and air spaced intermediate subassembly, and an aligned and air spaced image-side subassembly, the numerical data of which is substantially as follows, where $r$ is the radius of the lens surface, $d$ the lens axial thickness, $l$ the air axial spacing, $n_D$ the index of refraction, V the Abbe number, $\phi$ the lens diameter, the subscripts increasing progressively from the object side to the image side of the objective:

[Focal length=100.0]

|  |  | $n_D$ | V | $\phi$ |
|---|---|---|---|---|
| $r_1 = +81.34$ | $d_1=14.65$ | 1.6204 | 60.3 | 84 |
| $r_2 = \infty$ | $l_1=11.7$ | | | |
| $r_3 = -108.2$ | $d_2= 7.3$ | 1.6129 | 37.0 | 84 |
| $r_4 = +309.2$ | $l_2=21.45$ | | | |
| $r_5 = +284.2$ | $d_3= 8.75$ | 1.6477 | 33.9 | 96 |
| $r_6 = +96.6$ | $d_4=27.14$ | 1.5163 | 64.0 | 96 |
| $r_7 = -131.6$ | $l_3= 0.98$ | | | |
| $r_8 = +195.0$ | $d_5= 8.28$ | 1.5163 | 64.0 | 96 |
| $r_9 = \infty$ | $l_4= 0.98$ | | | |
| $r_{10}=+195.0$ | $d_6= 8.28$ | 1.5163 | 64.0 | 96 |
| $r_{11}= \infty$ | $l_5= 0.98$ | | | |
| $r_{12}=+78.0$ | $d_7=24.20$ | 1.5477 | 64.0 | 90 |
| $r_{13}=+306.0$ | $l_6=17.65$ | | | |
| $r_{14}=-130.0$ | $d_8= 3.86$ | 1.7440 | 44.7 | 70 |
| $r_{15}=+107.2$ | | | | |

8. Photographic objective having a relative aperture of F/1.24 and a peripheral vignetting less than 50% with a field of view of 36 degrees, comprising an object-side subassembly, an aligned and air spaced intermediate subassembly, and an aligned and air spaced image-side subassembly, the numerical data of which is substantially as follows, where $r$ is the radius of the lens surface, $d$ the lens axial thickness, $l$ the air axial spacing, $n$ the index of refraction, V the Abbe number, and $\phi$ the lens diameter, the subscripts increasing progressively from the object side to the image side of the objective:

|  |  | $n_D$ | V | $\phi$ |
|---|---|---|---|---|
| $r_1 = +3.3895$ | $d_1=0.10$ | 1.6779 | 55.3 | 0.63 |
| $r_2 = \infty$ | $l_1=0.05$ | | | |
| $r_3 = +0.47619$ | $d_2=0.06$ | 1.5814 | 40.8 | 0.59 |
| $r_4 = +0.36193$ | $l_2=0.329$ | | | |
| $r_5 = +0.94993$ | $d_3=0.167$ | 1.5163 | 64.0 | 0.70 |
| $r_6 = -1.12223$ | $l_3=0.01$ | | | |
| $r_7 = -11.560$ | $d_4=0.0627$ | 1.6236 | 36.7 | 0.70 |
| $r_8 = +0.73094$ | $l_4=0.1$ | | | |
| $r_9 = +1.3000$ | $d_5=0.08$ | 1.6236 | 36.7 | 0.79 |
| $r_{10}=+1.12223$ | $d_6=0.20$ | 1.5163 | 64.0 | 0.79 |
| $r_{11}= -0.94993$ | | | | |
| $r_{12}= \infty$ | $l_5=0.10$ | | | |
| $r_{13}= -1.6719$ | $d_7=0.10$ | 1.5400 | 59.6 | 0.88 | and the focal length is 1.000.

References Cited in the file of this patent

UNITED STATES PATENTS

| Number | Name | Date |
|---|---|---|
| 2,276,723 | Hiner | Mar. 17, 1942 |
| 2,313,460 | Warmsham | Mar. 9, 1943 |
| 2,445,594 | Bennett | July 20, 1948 |
| 2,502,544 | Warmisham | Apr. 4, 1950 |
| 2,541,484 | Schade | Feb. 13, 1951 |
| 2,578,624 | Back et al. | Dec. 11, 1951 |
| 2,604,013 | Schade | July 22, 1952 |